US008409454B2

(12) United States Patent
Hino et al.

(10) Patent No.: US 8,409,454 B2
(45) Date of Patent: Apr. 2, 2013

(54) PRODUCTION PROCESS FOR STRUCTURE AND PRODUCTION PROCESS FOR LIQUID DISCHARGE HEAD

(75) Inventors: Etsuko Hino, Tokyo (JP); Shoji Shiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 12/731,563

(22) Filed: Mar. 25, 2010

(65) Prior Publication Data

US 2010/0252529 A1 Oct. 7, 2010

(30) Foreign Application Priority Data

Apr. 1, 2009 (JP) ................................ 2009-088966

(51) Int. Cl.
*G01D 15/00* (2006.01)
*G11B 5/127* (2006.01)

(52) U.S. Cl. ........................................ 216/27; 29/890.1

(58) Field of Classification Search .................... 216/27; 29/890.1

See application file for complete search history.

(56) References Cited

U.S. PATENT DOCUMENTS

| | | | |
|---|---|---|---|
| 5,478,606 | A | 12/1995 | Ohkuma et al. |
| 5,916,452 | A | 6/1999 | Kobayashi et al. |
| 6,123,863 | A | 9/2000 | Shimomura et al. |
| 6,318,842 | B1 | 11/2001 | Shimomura et al. |
| 7,117,597 | B2 * | 10/2006 | Nishida ........................ 29/890.1 |
| 7,485,412 | B2 | 2/2009 | Okano et al. |
| 7,575,303 | B2 | 8/2009 | Kato |
| 7,629,111 | B2 | 12/2009 | Kubota et al. |
| 7,658,469 | B2 | 2/2010 | Hino et al. |
| 2006/0277755 | A1 | 12/2006 | Kubota et al. |
| 2007/0085877 | A1 | 4/2007 | Ohkuma et al. |
| 2008/0131793 | A1 * | 6/2008 | Lee et al. .......................... 430/5 |
| 2009/0025221 | A1 | 1/2009 | Saito et al. |
| 2009/0162797 | A1 | 6/2009 | Tusji et al. |
| 2009/0284567 | A1 | 11/2009 | Hino et al. |

* cited by examiner

*Primary Examiner* — Roberts Culbert

(74) *Attorney, Agent, or Firm* — Fitzpatrick, Cella, Harper & Scinto

(57) ABSTRACT

A production process for a structure includes preparing a substrate on which a first layer and a second layer are provided in this order; forming a second mold, which is a part of a mold member serving as a mold for forming the structure, from the second layer; etching the first layer using the second mold as a mask and thereby forming a first mold, which is another part of the mold member from the first layer; providing a coating layer which serves as the structure to cover the first mold and the second mold; and removing the first mold and the second mold and thereby forming the structure.

6 Claims, 2 Drawing Sheets

PRODUCTION PROCESS FOR STRUCTURE AND PRODUCTION PROCESS FOR LIQUID DISCHARGE HEAD

BACKGROUND OF THE INVENTION

1. Field of the Invention

The present invention relates to a production process for a structure and a production process for a liquid discharge head.

2. Description of the Related Art

Technique to form a fine structure on a substrate is applied to the field of MEMS. The application thereof includes a liquid discharge head used for an ink jet head.

Technology development has been continued for improving performance such as smaller droplets, higher driving frequency and more discharge ports in order to enhance recording properties of ink jet heads. Above all, a demand for smaller droplets for improving picture quality is strong, and a technology for manufacturing a fine structure with high precision which functions as an ink flow channel and a nozzle has been demanded. As such a technology, photolithography is excellent in both precision and simplicity of the process, and a process for producing an ink jet head by photolithography is disclosed in U.S. Pat. No. 5,478,606.

In recent years, however, further finer nozzle structures are becoming demanded to realize higher nozzle density for achieving finer droplets, which is for improving picture quality, as well as speed-up of operation and it has been recognized that the above-mentioned production process involves various problems. For example, when the finely designed structure results in decrease in the intervals of the flow channels, adhesion between the flow channel forming layer and the substrate may deteriorate. In the meantime, it becomes important to secure the liquid flow channel cross-sectional area so as to maintain ink discharging performance.

A method of processing the substrate by etching to secure this ink flow channel cross-sectional area of the ink jet head is disclosed in U.S. Pat. No. 7,575,303.

This production process requires, however, complicated process and an expensive apparatus, and thus simpler and less costly production processes have been demanded.

SUMMARY OF THE INVENTION

Therefore, an object of the present invention is to provide a production process for a structure which enables production of a fine structure in which adhesion to the substrate and the cross-sectional area of an empty space are secured. Another object of the present invention is to provide a production process for a reliable liquid discharge head in which adhesion between the flow channel forming layer and the substrate is secured and necessary flow channel cross sectional area is provided.

In order to achieve the above-mentioned objects, the present invention provides a production process for a structure including: preparing a substrate on which a first layer and a second layer are provided in this order; forming a second mold which is a part of a mold member serving as a mold for forming the structure from the second layer; etching the first layer using the second mold as a mask and thereby forming a first mold which is another part of the mold member from the first layer; providing a coating layer which serves as the structure to cover the first mold and the second mold; and removing the first mold and the second mold and thereby forming the structure.

The present invention also provides a production process for a liquid discharge head having a liquid discharge port through which liquid is discharged and a flow channel wall member containing a wall of a liquid flow channel which communicates with the liquid discharge port, the production process including preparing a substrate on which a first layer and a second layer are provided in this order; forming a second mold which is a part of a mold member serving as a mold for forming the structure from the second layer; etching the first layer using the second mold as a mask and thereby forming a first mold which is another part of the mold member from the first layer; providing a coating layer which serves as the structure to cover the first mold and the second mold; removing the first mold and the second mold and thereby forming the structure; and forming an opening which serves as the liquid discharge port through the coating layer, wherein the space formed by removing the first mold and the second mold serves as the flow channel.

According to the present invention, production of a fine structure is enabled in which adhesion to the substrate and the cross-sectional area of an empty space are secured. In addition, flow channels can be formed three-dimensionally by a simple and easy process and sufficient flow channel cross-sectional area and sufficient adhesion area between the flow channel forming layer and the substrate can simultaneously be secured even in a fine nozzle structure. Consequently, a liquid discharge head having good discharge characteristics and a high reliability can be obtained.

Further features of the present invention will become apparent from the following description of exemplary embodiments with reference to the attached drawings.

DESCRIPTION OF THE EMBODIMENTS

Figure 1A:
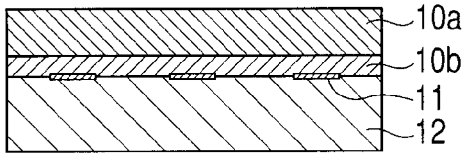
FIGS. 1A, 1B, 1C, 1D, 1E, 1F and 1G are outlined process drawings to illustrate the production process for an ink jet record head according to the present invention.

Preferred embodiments of the present invention will now be described in detail in accordance with the accompanying drawings.

The present invention will be described by referring to the drawings. In the following description, a flow channel of a liquid discharge head is taken up as an example of a structure and a production process for a liquid discharge head is exemplified in the description. However, the present invention is not limited to this and the structure according to the present invention can be applied to the field of MEMS such as acceleration sensors.

The production process for a liquid discharge head according to the present invention can realize good adhesion between the flow channel forming layer and the substrate and a large ink flow channel cross-sectional area and provides a liquid discharge head having good discharge characteristics and high reliability. A structure in which the thickness of the flow channel wall is increased in the vicinity of the substrate is formed in the production process for a liquid discharge head according to the present invention.

For that purpose, a member which serves as a mold of the liquid flow channel (referred to as a mold member) is formed of at least two resin layers. In the mold member, a material which has a higher solubility in the dissolving liquid is used as the layer disposed on the substrate side (bottom layer), and the upper layer with a lower solubility is formed on the bottom layer. After patterning the upper layer of the mold member, the bottom layer is partially removed with a dissolving liquid and thereby, the shape of a flow channel in which the bottom layer is carved and narrowed under the upper layer can be obtained. In addition, the bottom layer is partially removed so that the dimension thereof is smaller than those of the upper layer.

Hereinbelow, the production process for a liquid discharge head according to the present invention is described by referring to an embodiment of the present invention illustrated in the drawings. An ink jet record head is taken up as an application example of the present invention in the following description, but the applicable area of the present invention is not limited to this, and the present invention can be applied to preparation of biochips and liquid discharge heads for printing electronic circuits. The liquid discharge head includes, for example, heads for producing color filters as well as ink jet record heads.

Figure 3:
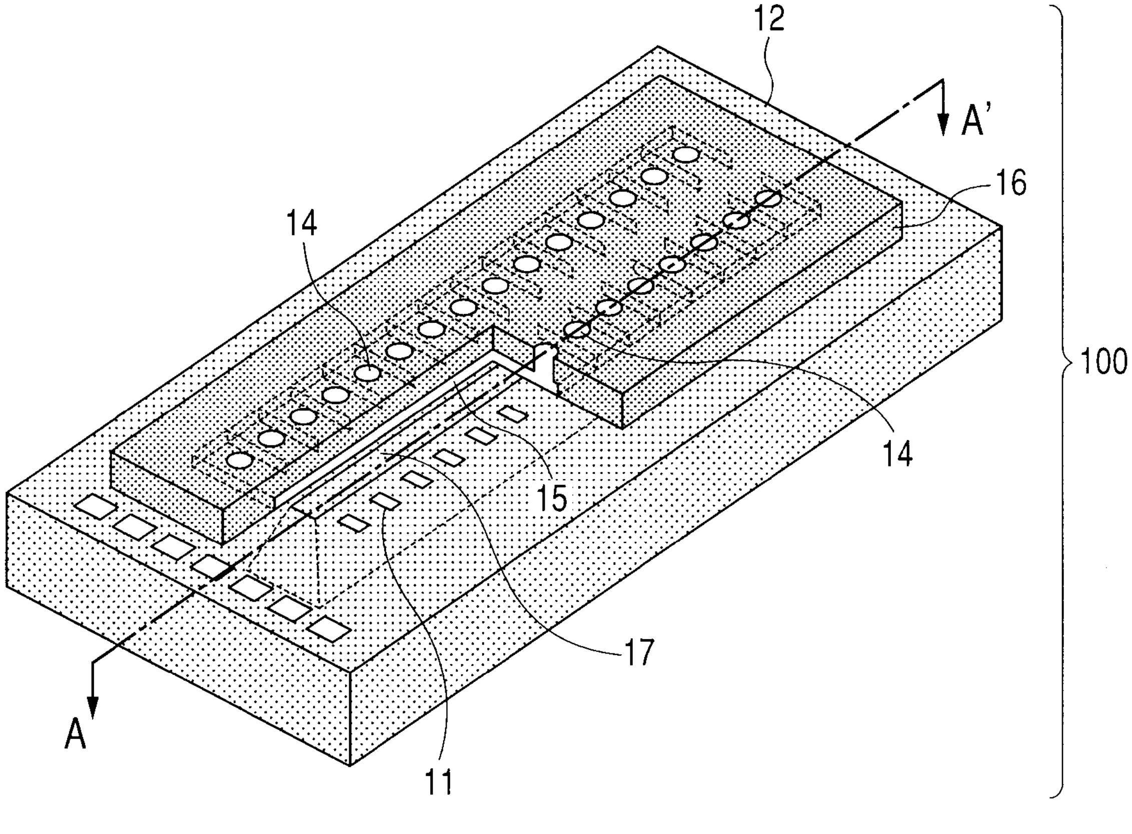
FIG. 3 is a perspective view illustrating an ink jet record head according to the present invention.

FIG. 3 is a schematic perspective view illustrating an example of the ink jet record head according to the present invention. An ink jet record head 100 has a substrate 12 which is provided with a discharge energy generating element 11 for generating energy to discharge ink. The ink jet record head 100 also has a flow channel wall member 16 provided on the substrate 12 as a structure which forms a flow channel 15 communicating with plural ink discharge ports 14 and an ink supply port 17 penetrating the substrate 12.

Next, the production process for an ink jet record head according to the present invention will be described by referring to FIGS. 1A to 1G. FIGS. 1A to 1G are cross-sectional views to illustrate the production process for an ink jet record head according to the present invention, and FIGS. 1A to 1G are schematic cross-sectional views at respective steps illustrating the cross section cut along line A-A' in FIG. 3 at a position perpendicular to the substrate 12.

FIG. 1A illustrates the state in which a resin, which becomes as a mold member of the ink flow channel, is provided on the substrate 12 having the discharge energy generating element 11 for generating energy to discharge ink. The resins in FIG. 1A form a first resin layer (upper layer 10*a*) having a relatively low solubility in a dissolving liquid to be used in a subsequent step and a second resin layer (lower layer 10*b*) having a relatively high solubility. Each of these upper and lower layers can be formed of plural layers although the case of two-layer construction is illustrated here for the sake of simplification.

Here, a positive type resist is used for the upper layer in order to meet the required properties such as properties apt for patterning and readily removable in a subsequent step. Among positive type resists, a positive type resist of main-chain decomposition type is advantageously used since it is desirable that the positive type resist in this construction is highly resistant to solvents. Examples of such positive type resists include resins mainly containing a resin having a carbonyl group and absorption in the UV region from 250 nm to 300 nm such as polymethyl isopropenyl ketone (PMIPK), polyvinyl ketone, polymer compounds consisting of (meth) acrylic acid esters such as polymethyl (meth)acrylate and polymethyl glutarimide. Of these, polymethyl isopropenyl ketone (PMIPK) or polymethyl methacrylate is advantageous from the viewpoint of sensitivity and contrast.

On the other hand, the resin serving as the bottom layer should be resistant to the solvent such as the developing liquid used for patterning of the upper layer and simultaneously more soluble in the dissolving liquid used in a subsequent step than the resin material used for the upper layer. The positive type resists of main-chain decomposition type are generally applied and developed with an organic solvent and on this account, as the bottom layer resin, resins resistant to the organic solvents and soluble in an alkaline aqueous solution (alkaline solution) are advantageous.

Such an alkali soluble resin is a resin having a hydroxyl group, a carboxyl group, a phosphone group or a sulfonic acid group in the main chain or side-chain, and examples thereof include cresol type novolac resins, polyhydroxy styrene resins, polyamide resins, polybenzoxazole resins or the precursors thereof and polyimide resins or the precursors thereof. Polyamide resins partially ring-closed to form a polybenzoxazole structure or a polyimide structure may also be included. Examples of such a resin include those having a structure represented by the general formula (I).

(Formula 1)

GENERAL FORMULA (1)

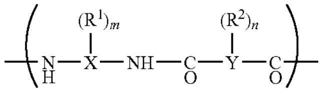

In the formula, both X and Y are divalent to hexavalent organic groups containing an aromatic ring; and $R^1$ is a hydroxyl group or —$OR^3$, wherein $R^3$ is an organic group having 1 to 15 carbon atoms; $R^2$ is a hydroxyl group, a carboxyl group, —$OR^3$ or —$COOR^3$; m and n are integers from 0 to 4. When plural numbers of $R^1$ and $R^2$ are present, they may be the same or different from each other. When $R^1$ is a hydroxyl group, heating after the resin is applied closes the ring to partially form a benzoxazole structure, and when $R^2$ is a carboxyl group, an imide structure is partially formed. The benzoxazole or imide structure is generated by heating after the application, but they may be partially generated by ring closure before the application.

The bottom layer is advantageously a polyimide layer formed by applying a polyamic acid derivative on the substrate followed by heating.

Figure 1B:
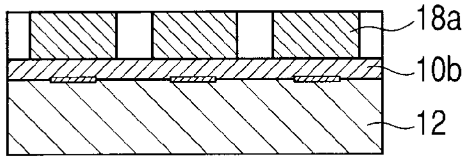
Figure 1C:
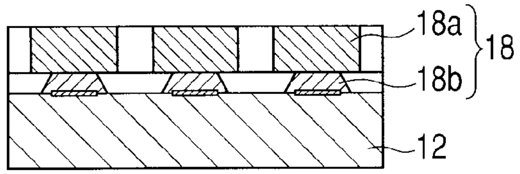

Next, a second mold 18*a*, which is a part of the mold of the flow channel, is formed by patterning the upper layer 10*a* by exposure and development (FIG. 1B). Then, it is immersed in an alkaline aqueous solution such as a tetramethylammonium hydroxide aqueous solution or a KOH aqueous solution and thereby the lower layer 10*b* is partially removed to form a first mold 18*b*, which is another part of the mold of the flow channel, and a mold member 18 of the flow channel as shown in FIG. 1C is obtained. The lower layer 10*b* is etched so that the first mold 18*b* is formed within the inside area of the second mold 18*a* when viewed in the direction from the second mold 18*a* toward the substrate 12.

Figure 1D:
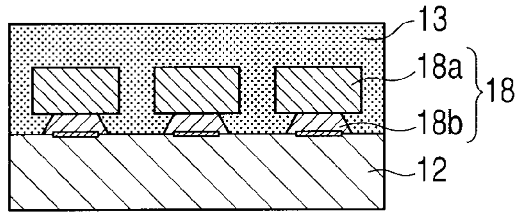

Next, a coating layer 13 is formed on the mold member 18 formed as above so that it covers the above-mentioned pattern (FIG. 1D). This coating layer is advantageously formed of a cationic polymerizable resin, in particular a photosensitive resin composition containing a photo cationic polymerization initiator from the viewpoint of patterning characteristics and ink resistance although not limited to these. The cationic polymerizable resin means resins including compounds having a vinyl group or a cyclic ether group which is a cationic polymerizable group. Among these, compounds having an epoxy group or an oxetane group are advantageously used. Specific examples of epoxy compounds include bisphenol-type epoxy resins formed of monomers or oligomers having a bisphenol backbone such as bisphenol-A-diglycidyl ether or bisphenol-F-diglycidyl ether, phenolic novolac type epoxy resins, epoxy cresol novolac resins, trisphenol methane type epoxy resins or resins having an alicyclic epoxy structure such as 3,4-epoxycyclohexenylmethyl-3', 4'-epoxycyclohexene carboxylate.

Furthermore, resins having an epoxy group in the side-chains of the alicyclic backbone like the following structure are advantageously used. In the following formula, n represents an integer.

(Formula 2)

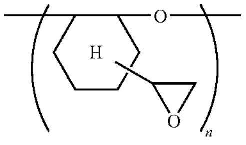

(n represents an integer)

Novolac resins having a bisphenol A backbone like the following structure are also advantageously used. Those in which n is an integer from 1 to 3 in the formula are advantageous, and those with n=2 are particularly advantageous.

(Formula 3)

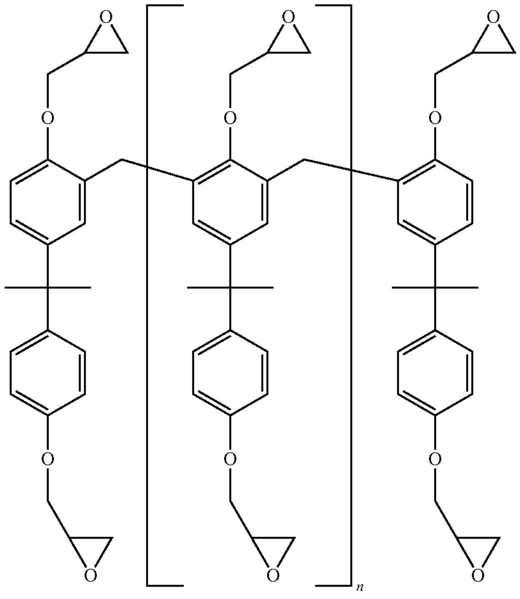

Examples of resins containing an oxetane compound include resins formed of phenolic novolac type oxetane compounds, cresol novolac type oxetane compounds, trisphenolmethane type oxetane compounds, bisphenol-type oxetane compounds, bisphenol-type oxetane compounds. When resins formed of these oxetane compounds are used together with epoxy resins, there may be advantageous cases where curing reaction is promoted.

This coating layer forms an ink flow channel (liquid flow channel) with the mold member 18 as a mold. In order to attain good patterning characteristics, these cationic polymerizable resins are preferably those which are solid at room temperature or have a melting point not less than 40° C. at a stage before the polymerization. In addition, compounds having an epoxy equivalent (or oxetane equivalent) of preferably not more than 2000, more preferably not more than 1000 are advantageously used. When the epoxy equivalents exceeds 2000, there may be cases where cross-linking density resulted in the curing reaction decreases, Tg or heat distortion temperature of the cured articles may be lowered and adhesion to the substrate and ink resistance may involve problems.

Figure 1E:
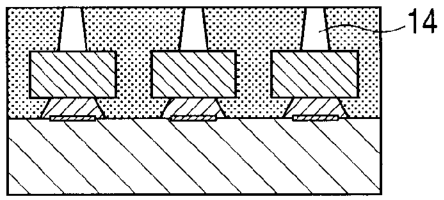

Then, the coating layer is subjected to pattern exposure and developing and thereby discharge ports 14 are provided (FIG. 1E).

Figure 1F:
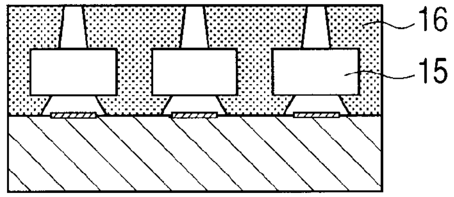

Next, the first resin layer 18*a* and the second resin layer 18*b* are removed to form ink flow channels 15 (FIG. 1F). As a method to remove the resin layer, for example, when a positive type resist of main-chain decomposition type is used, UV irradiation (photolysis type) necessary for decomposition is performed followed by developing by an organic solvent. The process can be performed by plural removing steps, for example, by performing an alkaline washing to dissolve the alkaline soluble resin of the lower layer. The flow channel wall member 16 as a structure can thereby be obtained.

Figure 1G:
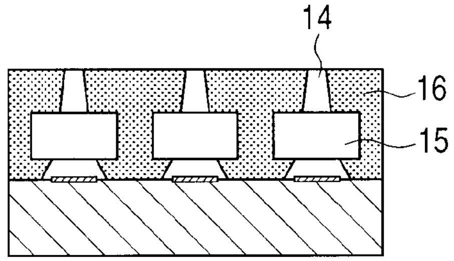

Finally, if necessary, UV irradiation, heating and so on are performed to promote curing of the flow channel wall member (FIG. 1G).

Ink supply ports are also formed on the substrate side appropriately as needed during or after the above-mentioned production step. Anisotropic etching and dry etching may be used for forming the discharge ports.

EXAMPLES

Hereinbelow, the present invention is described in more detail by referring to Examples.

Example 1

In this Example, an ink jet record head according to the procedure shown in FIGS. 1A-1G was prepared.

At first, polyimide precursor ProLIFT (product name, produced by Brewer Science, Inc.) was applied by spin coating on a silicon substrate on which an electric heat conversion element is provided as a discharge energy generating element and the resultant structure was heated at 120° C. for 90 seconds with a hot plate and then 200° C. for 30 minutes in an oven. The film thickness after heating was 3 μm. Polymethyl isopropenyl ketone was applied thereon by spin coating and heated at 120° C. by a hot plate for 6 minutes to form the first and second resins (FIG. 1A). The film thickness of the polymethyl isopropenyl ketone film after the heating was 13 μm. The above-mentioned polyimide film is alkali soluble and polymethyl isopropenyl ketone is a positive type resist of main-chain decomposition type which is disintegrated by UV irradiation and becomes soluble in organic solvents.

Next, the first mold 18*a* was formed by performing pattern exposure of the ink flow channel followed by development with a mask aligner UX3000 (product name, produced by Ushio Inc.). Methyl isobutyl ketone was used for development and isopropanol was used for rising (FIG. 1B).

Then, the developed material was immersed in a 2.38% TMAH aqueous solution for 45 seconds and washed with pure water to form the second mold 18*b* and thus the mold member 18 was formed (FIG. 1C).

Subsequently, the composition described in Table 1 was applied on the mold member 18 by spin coating as a coating layer 13 and heated at 90° C. for 3 minutes (FIG. 1D).

Pattern exposure for the discharge ports was performed with a mask aligner "MPA600super" (product name, produced by Canon Inc.). Methyl isobutyl ketone (MIBK) was used for development and isopropanol was used for rising to form the discharge ports 14 (FIG. 1E).

TABLE 1

| Composition | | |
|---|---|---|
| Epoxy resin | EHPE-3150 (product name, produced by Daicel Chemical Industries, Inc) | 100 parts by mass |
| Photo cationic polymerization initiator | SP172 (product name, produced by ADEKA Corporation) | 5 parts by mass |
| Reducing agent | Copper (II) trifluoromethanesulphonate | 0.5 parts by mass |
| Solvent | Xylene | 50 parts by mass |

After the surface of the nozzles was protected with a rubber-based protective film, masks for forming an ink supply port were appropriately disposed (not illustrated in the drawing) on the back side of the substrate and the ink supply port was formed by anisotropic etching of the silicon substrate (not illustrated in the drawing).

After the anisotropic etching was completed, the rubber-based protective film was removed and UV irradiation was totally performed again with a mask aligner UX3000 produced by Ushio Inc. to disintegrate the first mold 18*a*.

Subsequently, the substrate was immersed in methyl lactate for 1 hour while irradiated with supersonic wave to elute the first mold 18*a*. Then, the substrate was immersed in a 2.38% TMAH aqueous solution and the second mold 18*b* was removed to give the flow channel wall member (FIG. 1F). Then, heat treatment was performed for 1 hour to completely cure the coating layer (FIG. 1G).

Finally, ink supply members were attached to the ink supply port to form an ink jet record head.

Comparative Example 1

In substitution for the first resin layer formed of a polyimide film and a polymethyl isopropenyl ketone film, the first resin layer formed of a polymethyl isopropenyl ketone film was formed in the thickness of 16 μm.

Then, the pattern exposure of the ink flow channel was performed with a mask aligner UX3000 (product name, produced by Ushio Inc.). Methyl isobutyl ketone was used for development and isopropanol was used for rising.

Subsequently, the composition described in Table 1 was applied on the mold member 18 by spin coating and heated at 90° C. for 3 minutes.

Pattern exposure for the discharge ports was performed with a mask aligner "MPA600 super" produced by Canon Inc. Methyl isobutyl ketone was used for development and isopropanol was used for rising to form the discharge ports.

After the surface of the nozzles was protected with a rubber-based protective film, masks for forming an ink supply port were appropriately disposed on the back side of the substrate and the ink supply port was formed by anisotropic etching of the silicon substrate.

After the anisotropic etching was completed, the rubber-based protective film was removed and UV irradiation was totally performed again with a mask aligner UX3000 produced by Ushio Inc. to disintegrate the first resin layer which formed the mold member 18.

Subsequently, the substrate was immersed in methyl lactate for 1 hour while irradiated with supersonic wave to elute the first resin layer. Then, heat treatment was performed for 1 hour to completely cure the coating layer.

Finally, ink supply members were attached to the ink supply port to form an ink jet record head.

(Evaluation of Durability)

An ink produced by Canon Inc. BCI-6Cy (product name) was filled in the resultant ink jet record heads and a printing endurance test was performed. As a result, high-grade images were obtained with either head of Example and Comparative Example. However, when the silicon chip part of each head was immersed in BCI-6Cy and a pressure cooker test (121° C., 2 atm, 10 hours) was performed, the chip of Example 1 showed no significant changes while peeling between the flow channel walls between the nozzles and the substrate was observed in Comparative Example 1.

(Evaluation of Flow Channel Cross Section)

Figure 2A:
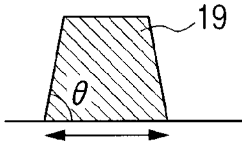
FIGS. 2A and 2B are conceptual views illustrating the cross section of flow channel patterns in Examples and Comparative Examples.
Figure 2B:
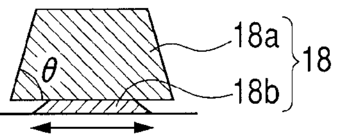

The cross section of the mold member 18 is illustrated in FIG. 2. FIGS. 2A and 2B are conceptual diagrams illustrating the cross section of the mold member 18 in Comparative Example 1 and Example 1, respectively. The state of FIG. 2B corresponds to the state of FIG. 1C. When the grounding width of the flow channel pattern is assumed to be 10 μm in the construction of Comparative Example 1 (pattern 19 formed of a polymethyl isopropenyl ketone film, thickness=16 μm, taper angle θ of the flow channel pattern=83°), the flow channel cross-sectional area is 128.6 $\mu m^2$ (FIG. 2A). The pattern 19 has a shape in which the area of the top surface is smaller than the area of the bottom base because of influence of diffraction rays and so on caused by exposure.

When the grounding width of the polyimide layer on the substrate is 10 μm and the maximum width of the polymethyl isopropenyl ketone layer was 13 μm in the layer construction similar to Example 1 (first mold 18*b* formed of a polyimide layer=3 μm, thickness taper angle θ=45°, second mold 18*a* formed of a polymethyl isopropenyl ketone layer=13 μm thickness, taper angle θ=83°), the flow channel cross-sectional area is 169.2 $\mu m^2$. The pattern of the second mold 18*a* has a shape in which the area of the top surface is smaller than the area of the bottom base because of the influence of diffraction rays and so on caused by exposure.

Thus according to the production process of this invention, the flow channel width of the upper layer part can be increased for a certain grounding width, and it may be said that the flow channel cross-sectional area can be enlarged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-088966, filed Apr. 1, 2009, which is hereby incorporated by reference herein in its entirety.

What is claimed is:

1. A production process for a structure, comprising:

preparing a substrate on which a first layer and a second layer are provided in this order;

forming a second mold from the second layer, the second mold being a part of a mold member;

etching the first layer using the second mold as a mask and thereby forming a first mold from the first layer, the first mold being another part of the mold member;

providing a coating layer to cover the first mold and the second mold; and removing the first mold and the second mold, a portion formed by removing the first layer and the second layer being a space enclosed by the coating layer, and thereby forming the structure from the coating layer.

2. The production process for a structure according to claim 1, wherein the first layer has a thickness smaller than the thickness of the second layer.

3. The production process for a structure according to claim 1, wherein the etching is performed so that the first mold is formed within an inside area of the second mold when viewed in a direction from the second mold toward the substrate.

4. The production process for a structure according to claim 1, wherein the second layer consists of a positive type photosensitive resin of main-chain decomposition type and the first layer consists of polyimide.

5. The production process for a structure according to claim 4, wherein the first layer is etched with an alkaline solution.

6. A production process for a liquid discharge head having a liquid discharge port through which liquid is discharged and a flow channel wall member containing a wall of a liquid flow channel which communicates with the liquid discharge port, the production process comprising:

preparing a substrate on which a first layer and a second layer are provided in this order;

forming a second mold from the second layer, the second mold being a part of a mold member serving as a mold for forming the structure;

etching the first layer using the second mold as a mask and thereby forming a first mold from the first layer, the first mold being another part of the mold member;

providing a coating layer to cover the first mold and the second mold, the coating layer forming the structure;

removing the first mold and the second mold and thereby forming the structure from the coating layer; and forming an opening which serves as the liquid discharge port through the coating layer, wherein a space formed by removing the first mold and the second mold serves as the flow channel.

* * * * *